US011093854B2

(12) United States Patent
Gao et al.

(10) Patent No.: US 11,093,854 B2
(45) Date of Patent: Aug. 17, 2021

(54) EMOJI RECOMMENDATION METHOD AND DEVICE THEREOF

(71) Applicant: Beijing Xinmei Hutong Technology Co., Ltd., Beijing (CN)

(72) Inventors: Xin Gao, Beijing (CN); Li Zhou, Beijing (CN); Xinyong Hu, Beijing (CN)

(73) Assignee: BEIJING XINMEI HUTONG TECHNOLOGY CO., LTD., Beijing (CN)

( * ) Notice: Subject to any disclaimer, the term of this patent is extended or adjusted under 35 U.S.C. 154(b) by 769 days.

(21) Appl. No.: 15/398,753

(22) Filed: Jan. 5, 2017

(65) Prior Publication Data
US 2018/0107945 A1    Apr. 19, 2018

(30) Foreign Application Priority Data
Oct. 19, 2016    (CN) .......................... 201610910534.7

(51) Int. Cl.
G06N 20/00        (2019.01)
G06N 7/00         (2006.01)
G06F 3/023        (2006.01)

(52) U.S. Cl.
CPC ........... *G06N 20/00* (2019.01); *G06F 3/0237* (2013.01); *G06N 7/005* (2013.01)

(58) Field of Classification Search
CPC ............................... G06N 20/00; G06N 7/005
See application file for complete search history.

(56) References Cited

U.S. PATENT DOCUMENTS

2011/0099003 A1* 4/2011 Isozu .................... G06F 16/353
                                                                  704/9
2012/0221496 A1* 8/2012 Goyal ..................... G06F 16/35
                                                                  706/12
(Continued)

OTHER PUBLICATIONS

Davoud Taghawi-Nejad, "probability density of the maximum of samples from a normalized uniform distribution." 2016. (Year: 2016).*

(Continued)

*Primary Examiner* — Luis A Sitiriche
*Assistant Examiner* — Sehwan Kim
(74) *Attorney, Agent, or Firm* — Anova Law Group, PLLC

(57) ABSTRACT

The present disclosure provides an emoji recommendation method and device. The emoji recommendation method may include: acquiring training sentences corresponding to emojis; clustering the training sentences to categories; according to a number of training sentences in each category, calculating a first probability corresponding to each category; according to correspondences between the training sentences and the emojis, determining emojis included in each category, and calculating a second probability corresponding to each emoji in each category; according to occurrences of each word in each category, calculating a third probability corresponding to each word in each category; according to the first probability and the third probability, calculating a fourth probability of a target sentence belonging to each category; according to the fourth probabilities corresponding to the categories, determining a target category for the target sentence; and according to the second probability corresponding to each emoji in the target category, recommending an emoji.

10 Claims, 4 Drawing Sheets

(56) References Cited

U.S. PATENT DOCUMENTS

| | | | | |
|---|---|---|---|---|
| 2015/0302436 | A1* | 10/2015 | Reynolds | G06Q 30/0201 |
| | | | | 705/7.32 |
| 2015/0379026 | A1* | 12/2015 | Todd | G06F 16/125 |
| | | | | 707/694 |
| 2016/0292148 | A1* | 10/2016 | Aley | G06F 40/274 |
| 2017/0116521 | A1* | 4/2017 | Wang | G06N 3/04 |
| 2018/0024972 | A1* | 1/2018 | Gosukonda | G06F 9/454 |
| | | | | 715/812 |

OTHER PUBLICATIONS

Liu, Bingwei, et al. "Scalable sentiment classification for big data analysis using naive bayes classifier." 2013 IEEE international conference on big data. IEEE, 2013. (Year: 2013).*

Liu, Bingwei, et al. "Scalable sentiment classification for big data analysis using naive bayes classifier." 2013 IEEE international conference on big data. IEEE, 2013. (Year: 2013).*

Davoud Taghawi-Nejad, "probability density of the maximum of samples from a normalized uniform distribution", StackExchange, 2016. (Year: 2016).*

Barbieri, Francesco, Francesco Ronzano, and Horacio Saggion. "What does this emoji mean? a vector space skip-gram model for twitter emojis." LREC 2016; May 23-28, 2016; Portorož, Slovenia. Paris: ELRA; 2016 (Year: 2016).*

Och Dag, J. Natt, et al. "Evaluating automated support for requirements similarity analysis in market-driven development." Proc. 7th Int. Workshop on Requirements Engineering: Foundation for Software Quality (REFSQ'01). 2001. (Year: 2001).*

Wijeratne, Sanjaya, et al. "EmojiNet: A Machine Readable Emoji Sense Inventory." 2016 (Year: 2016).*

Yuki Urabe et al., "Comparison of Emoticon Recommendation Methods to Improve Computer-Mediated Communication", Recommendation and Search in Social Networks, 2015, pp. 1-18, Switzerland.

\* cited by examiner

EMOJI RECOMMENDATION METHOD AND DEVICE THEREOF

CROSS-REFERENCES TO RELATED APPLICATIONS

This application claims priority of Chinese Patent Application No. 201610910534.7, filed on Oct. 19, 2016, the entire contents of which are hereby incorporated by reference.

FIELD OF THE INVENTION

The present disclosure generally relates to the technical field of input method and, more particularly, relates to an emoji recommendation method and device thereof.

BACKGROUND

With the continuous development of social network and the interact, as well as the popularization of intelligent mobile terminals, emoji is show a higher and higher frequency of use in people's daily communication by being able to deliver people's intentions, tone of voice, feelings and the like in a more brief and straightforward way. Correspondingly, emoji input has become an important part of the input method.

In current input methods, the emoji input methods mainly include the following two categories. The first emoji input method is that when an emoji needs to be inputted, the user initiatively clicks a preset emoji icon which displays a list interface showing a plurality of emojis. Via a page-turning operation or a sliding operation, the user may select and click the desired emoji from the list interface, thus realizing the input of the emoji. The second emoji input method includes configuring one or more tags for each emoji in advance, and each tag correspond to one meaning of the emoji. When the user inputs a text, whether or not a tag the same as the current input text exists is detected in real-time. If a tag the same as the current input text exists, an emoji corresponding to the detected tag will be recommended to the user, and once the user clicks the recommended emoji, the input of the emoji is realized.

However, in the first emoji input method, the user needs to manually select a desired emoji from a large amount of emojis, resulting in a low input efficiency. Further, though simplifying the emoji input process to some extent and improving the input efficiency by proactively recommending emojis to the user according to the current text inputted by the user as well as the preset tags, the second emoji input method, however, relies on the tags of each emoji. Therefore, only when the single word or the phase inputted by the user is the same as or matches a tag, the emoji recommendation will be triggered, which leads to a relatively low probability of the emoji recommendation being triggered. Thus, most of the time, the user still need to use the first method to input an emoji, which means it is quite difficult to effectively improve the emoji input efficiency.

The disclosed emoji recommendation method and device thereof are directed to solving at least partial problems set forth above and other problems.

BRIEF SUMMARY OF THE DISCLOSURE

The present disclosure provides an emoji recommendation method and device thereof, thus solving the issue of low input efficiency in existing emoji input methods. Directed to solving the above technical issues, the present disclosure discloses technical solutions as follows.

One aspect of the present disclosure provides an emoji recommendation method. The emoji recommendation method may include: acquiring training sentences corresponding to emojis and, in particular, each training sentence includes one or more words; clustering the training sentences to obtain a plurality of interpretive categories; according to a total number of one or more training sentences included in each interpretive category, calculating a first probability corresponding to each interpretive category; according to correspondence relationships between the training sentences and the emojis, determining one or more emojis included in each interpretive category, and calculating a second probability corresponding to each emoji in each interpretive category; according to the number of occurrence of each word in each interpretive category, calculating a third probability corresponding to each word in each interpretive category; according to the first probability and the third probability, utilizing the Bayes formula to calculate a fourth probability of a target sentence inputted by the user belonging to each of the interpretive categories and, in particular, the target sentence includes one or more target words; according to the fourth probabilities corresponding to the interpretive categories, determining a target interpretive category corresponding to the target sentence; and according to the second probability corresponding to each emoji included in the target interpretive category, recommending at least one emoji.

Optionally, according to the total number of the training sentences included in each interpretive category, calculating the first probability corresponding to each interpretive category includes: counting the total number $N_{c_i}$ of the training sentences included in each interpretive category $C_i$ respectively; and according to the equation below, calculating the first probability $P(C_i)$ corresponding to each interpretive category $C_i$, where i=1, 2, ..., m, and in is a total number of the interpretive categories.

$$P(C_i) = \frac{N_{C_i}}{\sum_{l=1}^{m} N_{C_l}}$$

Optionally, calculating the second probability corresponding to each emoji in each interpretive category includes: counting the number of occurrence $N_{ie_k}$ of each emoji $e_k$ in each interpretive category and according to the following equation, calculating the second probability $P(e_k|C_i)$ corresponding to each emoji $e_k$ in each interpretive category $C_i$ where i=1, 2, ..., m, m is the total number of the interpretive categories, k=1, 2, ..., p, and p is a total number of emojis.

$$P(e_k \mid C_i) = \frac{N_{ie_k}}{\sum_{l=1}^{p} N_{ie_l}}$$

Optionally, according to the number of occurrence of each word in each interpretive category, calculating the third probability corresponding to each word in each interpretive category includes: counting the number of occurrence $N_{iw_j}$ of each word $w_j$ in each interpretive category $C_i$; and according to the following equation, calculating the third probability P($w_j|C_i$) corresponding to each word $w_j$ in each interpretive category $C_i$, where i=1, 2, . . . , m, m is the total number of the interpretive categories; j=1, 2, . . . , q, and q is a total number of words.

$$P(w_j | C_i) = \frac{N_{iw_j}}{\sum_{l=1}^{q} N_{iw_l}}$$

Optionally, according to the fourth probabilities corresponding to the interpretive categories, determining the target interpretive category corresponding to the target sentence includes: determining whether the maximum value of the fourth probabilities is greater than a first threshold; and when the maximum value of the fourth probabilities is greater than the first threshold, using the interpretive category corresponding to the maximum value of the fourth probabilities as the target interpretive category.

Optionally, according, to the fourth probability, determining the target interpretive category corresponding to the target sentence includes: according to a descending order of the fourth probabilities, sorting the corresponding interpretive categories; according to a sorting result, calculating a sum of the fourth probabilities of first S interpretive categories. S being an integer greater than 1; determining whether a ratio of the maximum value of the fourth probabilities to the sum of the fourth probabilities of the first S interpretive categories is greater than a second threshold; and when the ratio is greater than the second threshold, using the interpretive category corresponding to the maximum value of the fourth probabilities as the target interpretive category.

Optionally, before according, to the first probability and the third probability, utilizing the Bayes formula to calculate the fourth probability of the target sentence inputted by the user belonging to each of the interpretive categories, the emoji recommendation method also the includes: determining whether a current input scenario is a preset scenario; and when the current input scenario is not the preset scenario, executing the step of according to the first probability and the third probability, utilizing the Bayes Formula to calculate a fourth probability of a target sentence inputted by the user belonging to each of the interpretive categories.

Optionally, before calculating the third probability corresponding to each word in the corresponding interpretive category, the emoji recommendation method also includes: when the training sentence has a first language style, performing segmentation of the training sentence; and/or performing stop word filtering for the words included in the training sentence.

A second aspect of the present disclosure provides an emoji recommendation device, and the emoji recommendation device includes a corpus training unit and a real-time recommendation unit.

In particular, the corpus training unit includes a clustering processing unit, a first calculation unit, a second calculation unit, and a third calculation unit. The clustering processing unit is configured to acquire each training sentence corresponding to each emoji, and performing clustering of the training sentences to obtain a plurality of interpretive categories, in particular, each training sentence includes one or more words.

Further, the first calculation unit is configured to, according to the total number of the training sentences included in each interpretive category, calculate the first probability corresponding to each interpretive category. The second calculation unit is configured to, according to the correspondence relationships between the training sentences and the emojis, determine the emojis included in each interpretive category and calculate the second probability corresponding to each emoji in each interpretive category. The third calculation unit is configured to, according to the number of occurrence of each, word in each interpretive category, calculate the third probability corresponding to each word in each interpretive category.

The real-time recommendation unit may include a fourth calculation unit, a target category determination unit, and a real-time recommendation executing unit. The fourth calculation unit is configured to, according to the first probability and the third probability, utilize the Bayes formula to calculate the fourth probabilities of the target sentence inputted by the user belonging to each of the interpretive categories. In particular, the target sentence may include one or more target words.

Further, the target category determination unit is configured to, according to the fourth probability, determine the target interpretive category corresponding to the target sentence. The real-time recommendation executing unit is configured to, according to the second probability corresponding to each emoji included in the target interpretive category, carry out the emoji recommendation.

Optionally, the target category determination unit may include at least one of a first determination unit and a second determination unit. The first determination unit is configured to determine whether the maximum value of the fourth probability is greater than a first threshold or not. When the maximum value of the fourth probability is greater than the first threshold, the first determination unit may use the interpretive category corresponding to the maximum value of the fourth probability as the target interpretive category.

Further, the second determination unit is configured to, according to the descending order of the fourth probability, sort the corresponding interpretive categories, and according to the sorting result, calculate the sum of the fourth probabilities of the first S interpretive categories, and further determine whether the ratio of the maximum value of the fourth probability to the sum of the fourth probabilities is greater than a second threshold or not. When the ratio is greater than the second threshold, the second determination unit may use the interpretive category corresponding to the maximum value of the fourth probability as the target interpretive category.

Optionally, the real-time recommendation unit may also include a scenario determination unit. The scenario determination unit is configured to determine whether the current input scenario is a preset scenario or not, and when the current input scenario is not a preset scenario, the scenario determination unit may trigger the fourth calculation unit.

Optionally, the corpus training unit also includes a segmentation unit and/or a stopword filtering unit. The segmentation unit is configured to, before calculating the third probability corresponding to each word in the corresponding interpretive category and when the training sentence is in the first language style, segment the training sentence. The stopword filtering unit is configured to, before calculating the third probability corresponding to each word in the corresponding interpretive category, carry out stopword filtering for the words included in the training sentence.

From technical solutions described above, the present disclosure first carries out clustering of the training sentences corresponding to each emoji, and carries out corpus training based on the interpretive category after clustering, thus avoiding the disorder caused by one emoji corresponding to a plurality of training sentences with unrelated meanings and improving the accuracy of the corpus training. Further, during the process of corpus training, the first probability corresponding to each interpretive category is calculated, and the third probability corresponding to each word in each interpretive category is calculated.

Further, according to the first probability and the third probability and combing the Bayes formula, probability analysis concerning the match of the meaning for the target sentence inputted by the user in real-tinge that is as accurate as each word is performed. Thus, the issue that the recommendation triggering probability being extremely low in existing recommendation methods based on absolute matching of the emojis is avoided. The target interpretive category determined by the final analysis is also ensured to be the interpretive category, having the closest real meaning to the target sentence, thus ensuring that the recommended emoji may better satisfy the current needs of the user. Accordingly, the recommendation accuracy is improved, and the input efficiency of the emojis by the user is improved, thus improving the user experience.

Other aspects of the present disclosure can be understood by those skilled in the art in light of the description, the claims, and the drawings of the present disclosure.

BRIEF DESCRIPTION OF THE DRAWINGS

To make more clearly the explanation of technical solutions in embodiments of the present disclosure or current techniques, drawings needed in the embodiments or current techniques are briefly illustrated below. Apparently, the drawings described below are only corresponding to some embodiments of the present disclosure, and it is possible for those ordinarily skilled in the art to derive other drawings from these drawings without creative effort.

DETAILED DESCRIPTION

To make those skilled in the art better understand technical solutions in embodiments of the present disclosure, and to make the above goals, features, and advantages of the embodiments of the present disclosure more apparent and easier to understand, hereinafter, the technical solutions in embodiments of the present disclosure will be illustrated in detail with reference to the accompanying drawings.

As discussed above, the recommendation triggering probability can be extremely low in existing recommendation methods that are based on absolute matching of the emojis. Thus, a user often needs to manually select a desired emoji from a large amount of emojis, resulting in a low emoji input efficiency.

Directed to solving the low input efficiency issue in existing emoji input methods, the present disclosure provides an improved emoji recommendation method and device. According to the present disclosure, clustering of the training sentences corresponding to each emoji is carried out first, and corpus training based on the interpretive category is carried out after clustering, thus avoiding the disorder caused by one emoji corresponding to a plurality of training sentences with unrelated meanings and improving the accuracy of the corpus training. Further, during the process of corpus training, the first probability corresponding to each interpretive category is calculated, and the third probability corresponding to each word in each interpretive category is calculated.

Further, in the present disclosure, according to the first probability and the third probability and combing the Bayes formula, probability analysis concerning the match of the meaning for the target sentence inputted by the user in real-time that is as accurate as each word is performed. Thus, the issue that the recommendation triggering probability being extremely low in existing recommendation methods based on absolute matching of the emojis may be avoided. The target interpretive category determined by the final analysis is also ensured to be the interpretive category having the closest real meaning to the target sentence, thus ensuring that the recommended emoji may better satisfy the current needs of the user. Accordingly, the recommendation accuracy is in proved, and the input efficiency of the emojis by the user is improved, thus improving the user experience.

Figure 1:
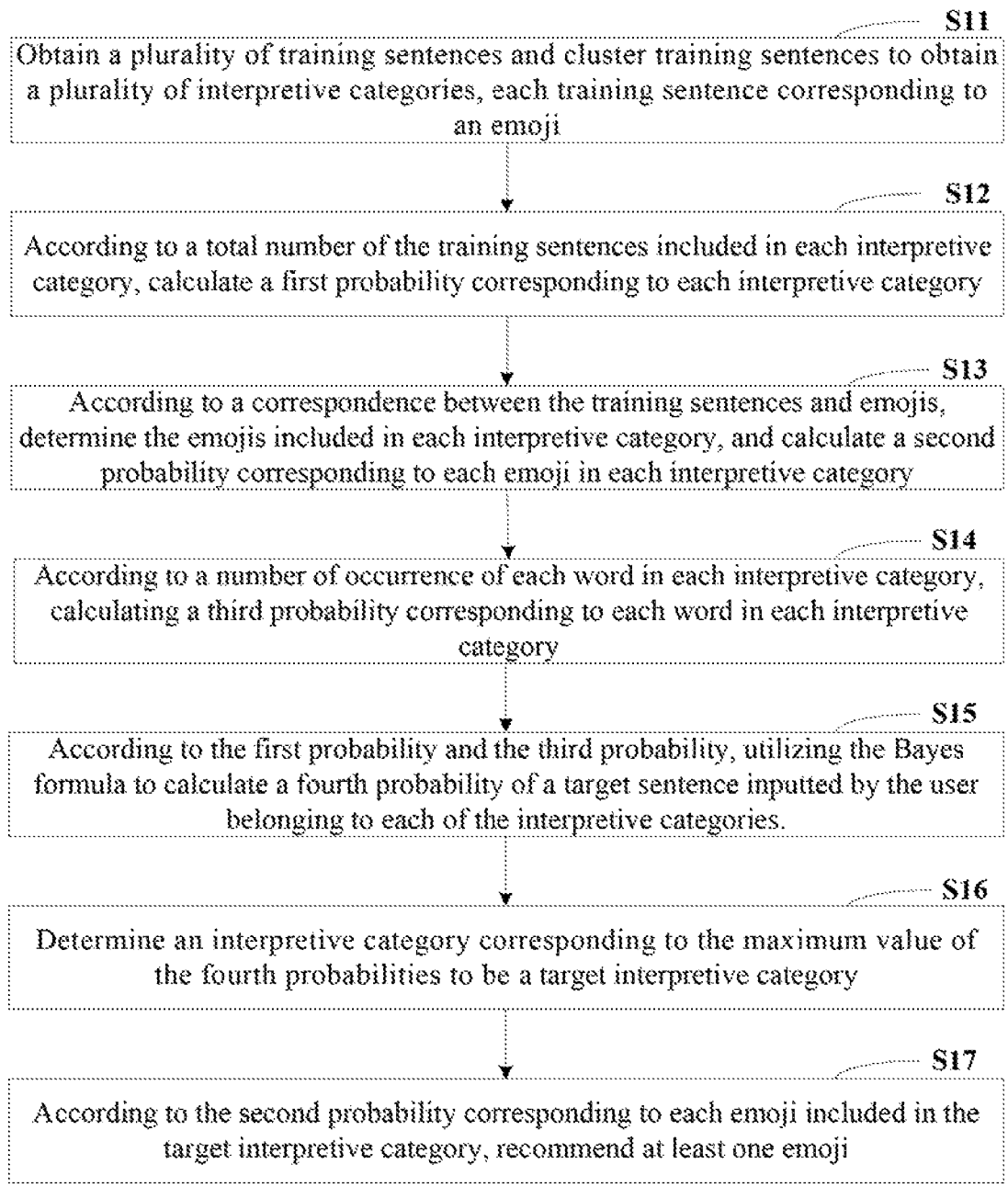
FIG. 1 illustrates a flow chart of an exemplary emoji recommendation method consistent with disclosed embodiments.

FIG. 1 illustrates a flow chart of an exemplary emoji recommendation method consistent with disclosed embodiments. The disclosed emoji recommendation method may be applied to any input method such as a Chinese Pinyin input method, a Chinese Wubi input method, and an English input method etc., which assists a user to input emojis and improves the emoji input efficiency. The input method may be implemented in a computing device including at least one processor, such as a phone, a computer, a tablet, etc.

As shown in FIG. 1, the emoji recommendation method may at least include acquiring each training sentence according to each emoji, and clustering training sentences to obtain a plurality of interpretive categories (S11). The above training sentences may refer to sentences that explain, the meanings of corresponding emojis. Each training sentence may include one or more words. Optionally, for different languages, the training sentence may specifically be a Chinese sentence, a Japanese sentence, an English sentence, and a French sentence, etc.

In actual application, one emoji may have a plurality of meanings, and each meaning may be described using a plurality of training sentences. That is, one emoji may correspond to a large amount of training sentences. For example, an emoji representing a hand palm "👋" may correspond to three meanings: hands-up stop, and high five. In particular, the meaning of "hands-up" may correspond to approximately 500 training sentences, such as "A hand held up showing its palm". The meaning of "stop" may correspond to approximately 600 training sentences, such as "stop". The meaning of "high-five" may correspond to approximately 550 training sentences such as "as a high-five". That is, a total number of approximately 500+600+550=1650 training sentences may correspond to the emoji representing a hand palm "👋". A plurality of interpretive categories may be obtained by clustering the 1650 training sentences and other training sentences corresponding to other emojis. Each interpretive category may correspond to a plurality of different emojis is having similar meanings.

The disclosed emoji recommendation method may be realized based on a recommendation model obtained from corpus training. Thus, the accuracy of the corpus training may need to be ensured in order to ensure the accuracy of the recommendation result. Given the meaning of the emoji representing a hand palm illustrated above as an example, the plurality of training sentences corresponding to a same emoji may have totally different literal meanings. Thus, if the training process is carried out directly using each emoji as a category, a plurality of unrelated training sentences corresponding to each emoji may be put in the same category, resulting in disorder and inaccuracy of the training process. Accordingly, the training accuracy may not be guaranteed.

Directed to solving the aforementioned issue, in embodiments of the present disclosure, all the training sentences may be clustered first, such that the sentences having similar meanings may be clustered into one category (i.e., one interpretive/descriptive category). Training may then be performed based on the interpretive category, thus ensuring the training accuracy.

Specifically, the present disclosure may use any existing unsupervised clustering method based on distance, such as k-means clustering algorithm, etc. In particular, during clustering, the similarity between two training sentences may be represented using the cosine distance between the two training sentences, namely, $$d_{ij} = \frac{s_{ij}}{\sqrt{n_i n_j}},$$

where $d_{ij}$ represents the cosine distance between the two training sentences, $n_i$ and $n_j$ represent the number of words in the two training sentences, respectively, and $s_{ij}$ represents the number of the same words in the two training sentences.

Optionally, after clustering each training sentence, a serial number may correspondingly be configured for each obtained interpretive category, for ease of data processing and transferring. For example, the interpretive category may be labeled as $C_i$, where i=1, 2, . . . , m, and m is a total number of the interpretive categories obtained after clustering.

TABLE 1

A table that records emojis and training sentences before and after clustering

| Before clustering | | After clustering | | |
|---|---|---|---|---|
| Emoji | Training sentence | Interpretive category | Training sentence | Emoji |
| $e_1$ | E11 | $C_1$ | E11 | $e_1$ |
|  | E12 |  | E21 | $e_2$ |
|  | E13 | $C_2$ | E12 | $e_1$ |
| $e_2$ | E21 |  | E13 | $e_1$ |
|  | E22 |  | E31 | $e_3$ |
| $e_3$ | E31 | $C_3$ | E22 | $e_2$ |

As shown above, Table 1 illustrates the effects of an exemplary clustering operation on the training sentences. Assume an emoji $e_1$ corresponds to three training sentences (E11, E12, and E13), an emoji $e_2$ corresponds to two training sentences (E21 and E22), and an emoji $e_3$ corresponds to one training sentence E31. According to the clustering algorithm, E11 and E21 may have similar meanings and be clustered into a same category $C_1$. E12, E13, and E31 may have similar meanings and be clustered into a same category $C_2$. E22 may be self-clustered into a same category $C_3$.

Further, the emoji recommendation method may include, according to a total number of the training sentences included in each interpretive category, calculating a first probability corresponding to each interpretive category (S12).

Optionally, in one embodiment, the specific method to calculate the first probability may include counting the total number $N_{C_i}$ of the training sentences included in each interpretive category $C_i$, respectively (S121), and according to the equation below, calculating the first probability $P(C_i)$ corresponding to each interpretive category $C_i$.

$$P(C_i) = \frac{N_{C_i}}{\sum_{i=1}^{m} N_{C_i}}$$

where i=1, 2, . . . , m, and m is the total number of interpretive categories.

For example, referring to Table 1, given the situation where m=3, after step S121, the total number of training sentences included in the three interpretive categories $C_1$, $C_2$, and $C_3$ may, respectively, be $N_{C_1}$=2, $N_{C_2}$=3, $N_{C_3}$=1. Further, after step S122, the first probability corresponding to the three interpretive categories $C_1$, $C_2$, and $C_3$ may, respectively, be calculated as follows.

The first probability corresponding to the interpretive category $c_1$ may be: $P(C_1)$=2/(2+3+1)=⅓. The first probability corresponding to the interpretive category $C_2$ may be: $P(C_2)$=3/(2+3+1)=½. The first probability corresponding to the interpretive category $C_3$ may be: $P(C_3)$=1/(2+3+1)=⅙.

Further, the emoji recommendation method may include, according to the correspondence relationships between the training sentences and emojis, determining the emojis included in each interpretive category, and calculating a second probability corresponding to each emoji in each interpretive category (S13).

Optionally, in one embodiment, the specific method to calculate the second probability may include counting the number of occurrence $N_{ie_k}$ of each emoji $e_k$, in each interpretive category $C_i$ (S131), and according to the following equation, calculating the second probability corresponding to each emoji $e_k$ in each interpretive category $C_i$ (S132).

$$P(e_k | C_i) = \frac{N_{ie_k}}{\sum_{l=1}^{p} N_{ie_l}}$$

where i=1, 2, . . . , m, m is the total number of the interpretive categories, k=1, 2, . . . , p, and p is the total number of emojis.

For example, referring to Table 1, given the situation where m=3 and p=3, after step S131, the following results may be obtained. In the interpretive category $C_1$ (i.e., i=1), the number of occurrence of $e_1$ may be $N_{1e_1}$=1 the number of occurrence of $e_2$ may be $N_{1e_2}$=1, and the number of occurrence of $e_3$ may be $N_{1e_3}$=0 (i.e., $e_3$ does not exist in $C_1$).

Further, in the interpretive category $C_2$ (i.e., i=2), the number of occurrence of $e_1$ may be $N_{2e_1}$=2 the number of occurrence of $e_2$ may be $N_{2e_2}$=0, and the number of occurrence of $e_3$ may be $N_{2e_3}$=1. In the interpretive category $C_3$ (i.e., i=3) the number of occurrence of $e_1$ may be $N_{3e_1}$=0, the number of occurrence of $e_2$ may be $N_{3e_2}$=1, and the number of occurrence of $e_3$ may be $N_{3e_3}$=0.

Further, after step S132, the following results may be obtained. In the interpretive category $C_1$ (i.e., i=1), the second probability corresponding to $e_1$ may be $$P(e_1 \mid C_1) = \frac{N_{1e_1}}{N_{1e_1} + N_{1e_2} + N_{1e_3}} = 1/(1+1+0) = 1/2,$$

be $P(e_2|C_1)=\frac{1}{2}$, and the second probability corresponding to $e_3$ may be $P(e_3|C_1)=0$. In particular, because $e_3$ does not exist in $C_1$, $P(e_3|C_1)$ may no longer need to be calculated in actual applications.

In the interpretive category $C_2$ (i.e., i=2), the second probability corresponding to $e_1$ may be $P(e_1|C_2)=2/(2+0+1)=\frac{2}{3}$, the second probability corresponding to $e_2$ may be $P(e_2|C_2)=0$, and the second probability corresponding to $e_3$ may be $P(e_3|C_2)=1/(2+0+1)=\frac{1}{3}$. In the interpretive category $C_3$ (i.e., i=3), the second probability corresponding to $e_1$ may be $P(e_1|C_3)=0$, the second probability corresponding to $e_2$ may be $P(e_2|C_3)=1$, and the second probability corresponding to $e_3$ may be $P(e_3|C_3)=0$.

Further, the emoji recommendation method may include, according to the number of occurrence of each word in each interpretive category, calculating a third probability corresponding to each word in each interpretive category (S14). All the words involved in the training sentences may be sequentially numbered as $w_j$, in particular, j=1, 2, . . . , q, and q is the total number of the words.

Each training sentence may consist of one or more words selected from the above q words. Each word may appear in one or more training sentences, and the number of occurrence of each word in the same training sentence nay also be one or more. Thus, in a certain interpretive category, a certain word may appear once or a plurality of times, and step S14 may be designed to count the number of occurrence $N_{iwj}$ (in particular, i=1, 2, . . . , m, and m is the total number of the interpretive categories) that each word $w_j$ appears in each interpretive category $C_i$.

According to $N_{iwj}$ (i=1, 2, . . . , m), the third probability $P(w_j|C_i)$ corresponding to each word in each interpretive category may be calculated. Optionally, the third probability $P(w_j|C_i)$ corresponding, to each word $w_j$ in each interpretive category $C_i$ may be calculated according to the following equation:

$$P(w_j \mid C_i) = \frac{N_{iw_j}}{\sum_{l=1}^{q} N_{iw_l}}$$

In the present disclosure, the above-described steps S11~S14 may complete the corpus training-process. Optionally, the interpretive category, the first probability, the second probability, and the third probability may all be stored in the recommendation model. When a user inputs words, the recommendation model may be invoked to recommend emojis to the user, and the specific steps are shown in step S15~S17.

Specifically, the emoji recommendation method may include, according to the first probability and the third probability, utilizing the Bayes formula to calculate the fourth probability of the target sentence inputted by the user belonging to each of the interpretive categories (S15). In particular, the target sentence inputted by the user may consist of one or more target words.

Assume the target sentence consist of n number of target words, which are $w_1$, $w_2$, $w_3$, . . . , $w_n$, respectively. Then according to the Bayes formula, the probability (i.e., the fourth probability) of the target sentence belonging to any interpretive category $C_i$ may be calculated as:

$$P(C_i \mid w_1, w_2, w_3, \ldots, w_n) = \frac{P(w_1, w_2, w_3, \ldots, w_n \mid C_i) P(C_i)}{P(w_1, w_2, w_3, \ldots, w_n)} = \frac{\prod_{j=1}^{n} P(w_j \mid C_i) P(C_i)}{P(w_1, w_2, w_3, \ldots, w_n)}$$

The emoji recommendation method may include, according to the fourth probability, determining the target interpretive category corresponding to the target sentence (S16).

In one embodiment, the interpretive category corresponding to the value of the fourth probability may be used as the target interpretive category. In particular, under the condition that $w_1$, $w_2$, $w_3$, . . . , $w_n$ are fixed, the denominator portion $P(w_1, w_2, w_3, \ldots, w_n)$ in the calculation equation of the fourth probability may be a fixed value. Thus, in actual applications, step S15 may only need to calculate the numerator portion $$\prod_{j=1}^{n} P(w_j \mid C_i) P(C_i).$$

Further, by comparing the values of each numerator portion, the interpretive category corresponding to the fourth probability with a maximum value may be determined, that is, the target interpretive category may be determined. For each interpretive category, the numerator portion may represent a continued product of the products of the third probability corresponding to each target word in the interpretive category and the first probability corresponding to the interpretive category.

Further, the emoji recommendation method may include, according to the second probability corresponding to each emoji included in the target interpretive category, recommending at least one emoji (S17). In some embodiments, the at least one recommended emoji may be presented as at least one candidate selection in a user interface of the input method. Further, as the user inputting more words to a current sentence, the disclosed method may include dynamically adjusting the recommended emoji. For example, steps S15~S17 may be repeated to output recommended emoji corresponding to the current sentence.

In one embodiment, the higher the fourth probability, the better the matching between the overall meaning of the n number of words $w_1$, $w_2$, $w_3$, . . . , $w_n$ and each emoji in the interpretive category corresponding to the fourth probability. Thus, the interpretive category corresponding to the maximum value of the fourth probability may be used as the target interpretive category. After the emojis in the target interpretive category are recommended, the possibilities of the emojis being used by the user be higher, thus more effectively improving the speed that the user inputs emojis.

In one embodiment, according to the descending order of the second probability, one or more emojis included in the target interpretive category may be displayed as the emoji candidate for the user to choose. That is, one or more emojis corresponding to the maximum second probability in the target interpretive category may be recommended for the user to choose. Further, after receiving the input confirmation operation from the user, the emoji candidate corresponding to the input confirmation operation may be inputted to a current text box. In particular, the input confirmation operation may be a direct click on a certain emoji candidate, or a press on a numeric key showing the same number as, the serial number corresponding to a certain emoji candidate.

From aforementioned technical solutions, the present disclosure may first carry out corpus training using the training sentence corresponding to each emoji as the corpus. The corpus training may include clustering the training sentence to obtain a plurality of interpretive categories, and calculate the first probability, the second probability, and the third probability based on the interpretive category, respectively. Later, when a user inputs words, real-time analysis of the target sentence inputted by the user may be performed based on the first probability and the third probability, and the target interpretive category that best matches the target sentence may be determined. Finally, one or more emojis in the target interpretive category may be recommended to the user based on the second probability, and once the user performs simple input confirmation operation of the recommended emoji, the input of the corresponding emoji may be completed.

The present disclosure may first carry out clustering of the training sentences corresponding to each emoji, and carry out corpus training based on the interpretive category after clustering, thus avoiding the disorder caused by one emoji corresponding to a plurality of training sentences with unrelated meanings and improving the accuracy of the corpus training. Further, during the process of corpus training, the first probability corresponding to each interpretive category may be calculated, and the third probability corresponding to each word, in each interpretive category may be calculated.

Further, according to the first probability and, the third probability and combing the Bayes formula, probability analysis concerning the matching of the meaning for each word in the target sentence inputted by the user in real-time may be performed. Accordingly, the issue of the recommendation triggering probability being extremely low in existing recommendation methods based on absolute matching of the emojis may be avoided. The target interpretive category determined by the final analysis may also be ensured to be the interpretive category having the closest real meaning to the target sentence, thus ensuring that the recommended emoji may better satisfy the current needs of the user. Accordingly, the recommendation accuracy may be improved, and the input efficiency of the emojis by the user may be improved, thus improving In the riser experience.

In one embodiment, to improve the emoji recommendation accuracy, determine the target interpretive category corresponding to the target sentence according to the fourth probability (S16) may be practiced in a plurality of embodiments. Two embodiments are illustrated hereinafter.

In one embodiment, step S16 may specifically include determining whether the maximum value of the fourth probability is greater than a first threshold (S1611), and when the maximum value of the fourth probability is greater than the first threshold, using the interpretive category corresponding to the maximum value of the fourth probability as the target interpretive category (S1612).

In particular, the first threshold may be a probability value, and the value range of the first threshold may be an open interval (0, 1). That is, the first threshold may be greater than 0 and smaller than 1. Optionally, in step S1611, the value that the first threshold compared to may be the fourth probability, or may be the numerator portion in the calculation equation of the fourth probability.

Assume by comparing the fourth probability $P(C_1|w_1, w_2, w_3, \ldots, w_n)$ corresponding to each interpretive category, the maximum value is $P(C_1|w_1, w_2, w_3, \ldots, w_n)$, then $P(C_1|w_1, w_2, w_3, \ldots, w_n)$ may be compared with the preset first threshold to see whether $P(C_1|w_1, w_2, w_3, \ldots, w_n)$ is greater than the preset first threshold. If $P(C_1|w_1, w_2, w_3, \ldots, w_n)$ is treater than the preset first threshold, the interpretive category $C_1$ corresponding to $P(C_1|w_1, w_2, w_3, \ldots, w_n)$ may be used as the target interpretive category.

Optionally, assume only the numerator portions $$\prod_{j=1}^{n} P(w_j | C_i) P(C_i)$$

in the calculation equation of the fourth probability are compared, and the maximum value is $$\prod_{j=1}^{n} P(w_j | C_1) P(C_1), \text{ then } \prod_{j=1}^{n} P(w_j | C_1) P(C_1)$$

may be compared with the preset first threshold to see whether $$\prod_{j=1}^{n} P(w_j | C_1) P(C_1)$$

is greater than the preset first threshold or not. If $$\prod_{j=1}^{n} P(w_j | C_1) P(C_1)$$

is greater than the preset first threshold, the interpretive category $C_1$ corresponding to $$\prod_{j=1}^{n} P(w_j | C_1) P(C_1)$$

may be used as the target interpretive category.

Further, when the maximum value of the fourth probability (or the numerator portions of the fourth probability) is smaller than or equal to the first threshold, no follow-up steps may be executed. That is, the emoji recommendation may not be performed. Thus, emoji recommendation may be carried out when and only when a matching degree (i.e., the fourth probability) between the target sentence and the interpretive category is higher than the preset degree (i.e., the matching degree corresponding to the first threshold).

When the matching degrees between each interpretive category and the target sentence are all relatively low, even if the emoji is recommended, the possibility of the recommended emoji being selected by the user for input may be quite low. Accordingly, the present disclosure may not execute emoji recommendation under the condition that the matching degrees between each interpretive category and the target sentence are all relatively low, thus avoiding the influence of the recommendation operation on the user input operation.

The specific values of the first threshold may be configured according to the accuracy requirements of the emoji recommendation. The higher the accuracy requirement, the larger the first threshold. Further, in one embodiment, the comparative object in step S1611 may be the fourth probability, and in another embodiment, the comparative object in step S1611 may be the numerator portion in the calculation equation of the fourth probability. In the two embodiments, the first thresholds may be different.

In one embodiment, step S16 may specifically include, according to a descending order of the fourth probability, sorting each interpretive category (S1621), and according to the sorting result, calculating a sum of the fourth probabilities of the first S interpretive category (S1622). Step S16 may further include determining whether the ratio of the maximum value of the fourth probability to the sum of the fourth probabilities is, greater than a second threshold (S1623), and when the ratio is greater than the second threshold, using the interpretive category corresponding to the maximum value of the fourth probability as the target interpretive category (S1624).

In particular, S may be a preset positive integer. The comparative object in step S1621~S1624 may be, the fourth probability, or may be the numerator portion in the calculation equation of the fourth probability (i.e., in step S15, only the numerator portion is calculated, and the value of the actual fourth probability no longer need to be calculated).

For example, assume the preset second threshold is 0.5, according to the descending order of the fourth probability or the numerator portion in the calculation equation of the fourth probability, each interpretive category may be sorted. The following results may be obtained: the maximum value of the fourth probability (or the numerator portion of the fourth probability) may be 03, and the sum of the fourth probabilities (or the sum of the numerator portions) corresponding to the first five (i.e. S=5) interpretive categories may be 0.5.

Because the ratio of the maximum value of the fourth probability (or the numerator portion) to the sum of the fourth probabilities (or the numerator portions) corresponding to the first five interpretive categories is 0.3/0.5=0.6, which is greater than the preset second threshold 0.5, the interpretive category corresponding to the maximum value of the fourth probability (or the numerator portion) may be used as the target numerator category, and the follow-up step S17 may be executed to complete the emoji recommendation.

When the ratio obtained in step S1623 is not greater than the second threshold, the follow-up steps may no longer be executed. That is, no emoji recommendation may be performed. For example, the maximum value of the fourth probability for the numerator portion) may be 0.2, and the sum of the fourth probabilities (or the numerator portions) corresponding to the first five (assume S=5) interpretive categories may be 0.5, then the ratio may be 0.2/0.5=0.4. Because 0.4 is smaller than the preset threshold 0.5, no interpretive category showing a matching degree with the target sentence higher than the preset degree (i.e., the matching degree corresponding to the second threshold) may exist. Thus, the emoji recommendation may be prohibited to avoid inappropriate emoji recommendation that affects normal input by the user.

The aforementioned embodiments merely introduce two common methods based on the fourth probability that determined whether a training sentence that satisfies requirements of the matching degree between the target sentence and the training sentence exists. When and only when training sentence that satisfies the matching degree between the target sentence and the training sentence exists, the training sentence may be used as the target training sentence.

Figure 2:
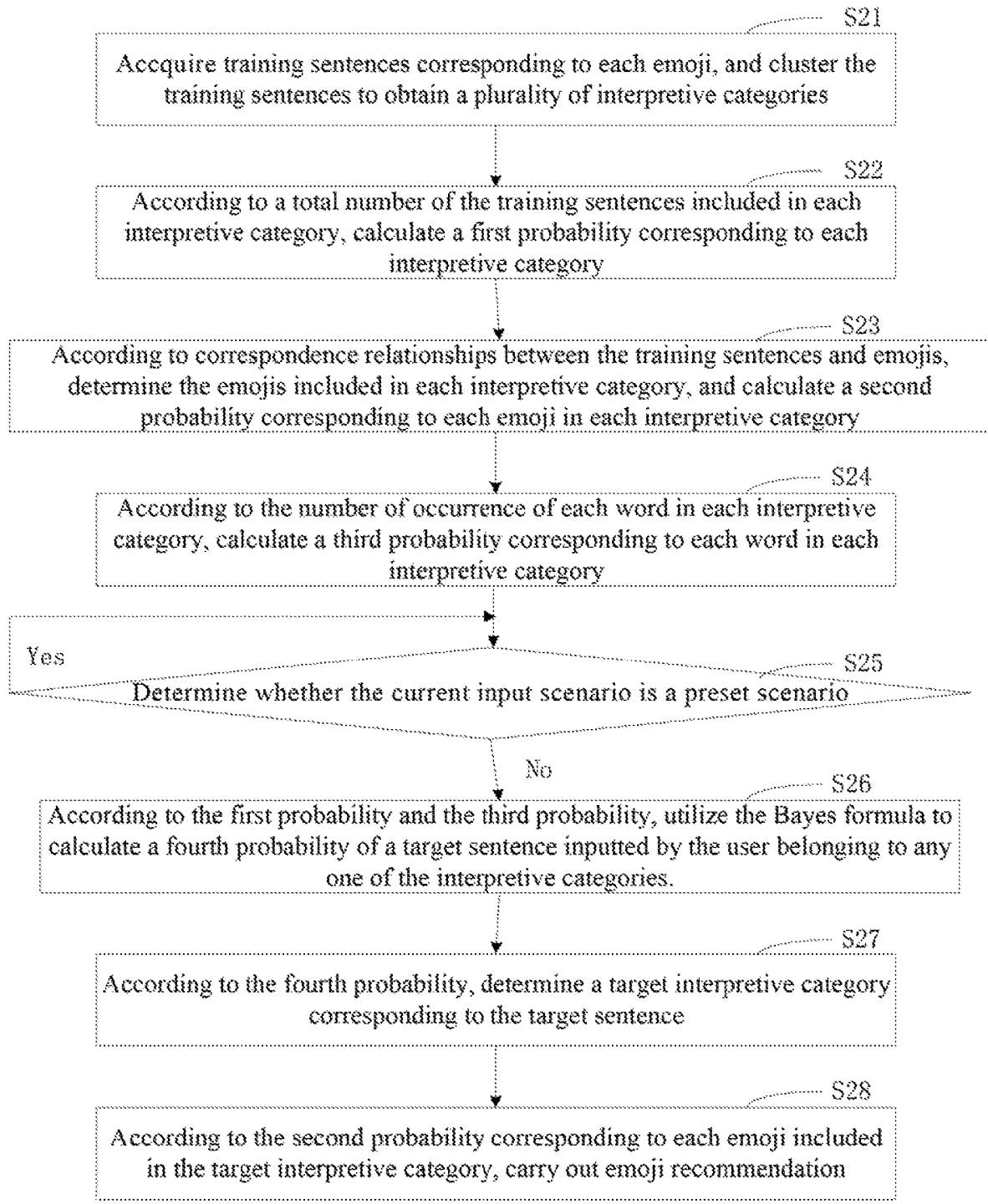
FIG. 2 illustrates a flow chart of another exemplary emoji recommendation method consistent with disclosed embodiments.

Further, based on the second probability of the emoji in the target training sentence, the emoji recommendation may be executed, thus avoiding inappropriate emoji recommendation to influence the normal input by the user. In actual application, those skilled in the art may derive other embodiments that determine the target training sentence based on the fourth probability, which shall all fall within the protection scope of the present disclosure, FIG. 2 illustrates a flow chart of another exemplary emoji recommendation method consistent with disclosed embodiments. Referring to FIG. 2, the emoji recommendation method may include steps S21~S28. In particular, step S21 may include acquiring each training sentence according to each emoji and clustering the training sentences to obtain a plurality of interpretive categories. Step S22 may include, according to the total number of the training sentences included in each interpretive category, calculating a first probability corresponding to each interpretive category.

Further, step S23 may include, according to the correspondence relationships between the training sentences and the emojis, determining the emojis included in each interpretive category, and calculating a second probability corresponding to each emoji in each interpretive category. Step S24 may include, according to the number of occurrence of each word in each interpretive category, calculating a third probability corresponding to each word in each interpretive category.

The above-described steps S21~S24 may complete the corpus training process to obtain the recommendation model. The recommendation model may record training data such as the interpretive category, the first probability, the second probability, and the third probability, etc. Specific principles may refer to related description in steps S11~S14, which are not repeatedly described herein.

Further, step S25 may include determining whether the current input scenario is a preset scenario, if yes, step S25 may be re-executed (or the current recommendation process may be terminated), otherwise, step S26 may be executed.

Further, step S26 may include, according to the first probability and the third probability, utilizing the Bayes formula to calculate the fourth probability of the target sentence inputted by the user belonging to each of the interpretive categories.

Further, step S27 may include, according to the fourth probability, determining the target interpretive category corresponding to the target sentence.

Further, step S28 may include, according to the second probability corresponding to each emoji included in the target interpretive category, carrying out emoji recommendation.

Optionally, the above-described preset scenarios may include formal scenarios in which the occurrence of emojis are inappropriate, such as business letter editing scenarios and contract editing scenarios.

In the present disclosure, step 25 may be configured to define the triggering timing of the emoji recommendation, and steps S26~S28 may only be executed in informal situations where the occurrence of emoji is appropriate, thus, assisting the users to rapidly input emojis. Simultaneously, the frequent emoji recommendation in situations where the occurrence of emojis is inappropriate may be avoided and the input efficiency of normal words may not be affected.

In one embodiment, to ensure the accuracy of calculating the third frequency, before calculating the third frequency (i.e., before executing step S14 or step S24), the following steps may also be executed: when the training sentence is in the first language style, the training sentence may be segmented.

The aforementioned first language may include languages such as Chinese and Japanese that cannot distinguish each word included in one sentence. When the training sentence is in the first language, the present disclosure may distinguish each word included in the training sentence via a process of segmentation. When the training sentence is in English or French, etc., different words may be easily distinguished by using space characters.

In another embodiment, to ensure the accuracy of calculating the third frequency, before calculating the third frequency (i.e., before executing step S14 or step S24), the following steps may be executed: carrying out stopword filtering for words included in the training sentence.

The stopwords may refer to words frequently used but has no actual meaning. Specifically, the stopwords may mainly include auxiliary verbs, adverbs, prepositions, conjunctions, etc., such as "the", "a", "an", "that", "is", "what", etc. in English. If applying the stopwords to the corpus training, the accuracy of the third probability of other words having actual meanings may highly likely be affected and, the determination accuracy of the target interpretive category that the target language belongs to may eventually be affected. Thus, before calculating the third probability, the present disclosure may carry out stopword filtering for each training sentence. Further, for the target sentence inputted by the user in real-time, the stopword filtering may be first executed, and then, the fourth probability may be calculated according to the filtered target sentence.

Similarly, based on the purpose of improving the recommendation accuracy, when executing the stopword filtering for the training sentence or the target sentence, punctuations in the training sentence or the target sentence may be removed.

Those skilled in the art may understand that techniques in embodiments of the present disclosure may be realized by software in combination with a necessary general hardware platform. Based on this understanding, the technical solutions in embodiments of the present disclosure may be embodied in a form of a software product (including a program or coding, etc.). The computer software product may be stored in an image processing chip of the image collecting device, and when the image processing chip executes the computer software product, any emoji recommendation method described in the aforementioned embodiments may be realized.

Figure 3:
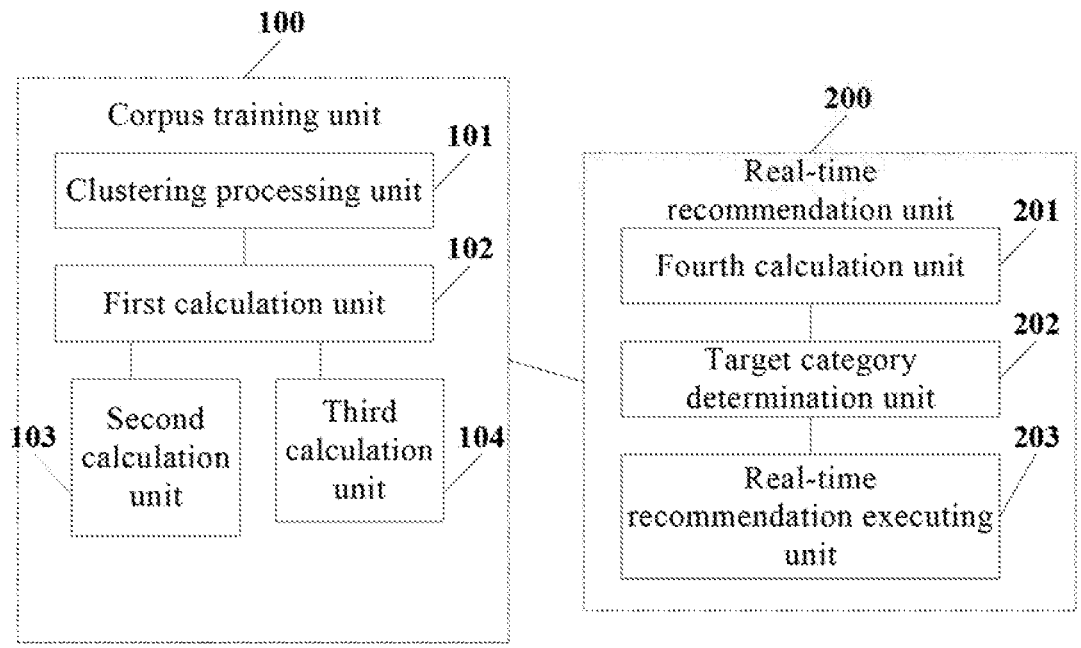
FIG. 3 illustrates a schematic view of an emoji recommendation device consistent with disclosed embodiments.

Correspondingly, the present disclosure also provides an emoji recommendation device. FIG. 3 illustrates a schematic view of an emoji recommendation device consistent with disclosed embodiments. As shown in FIG. 3, the device may include a corpus training unit 100 and a real-time recommendation unit 200.

In particular, the corpus training unit 100 may include a clustering processing unit 101, a first calculation unit 102, a second calculation unit 103, and a third calculation unit 104. The clustering processing unit 101 may be configured to acquire each training sentence corresponding to each emoji, and performing clustering on the training sentences to obtain a plurality of interpretive categories. In particular, each training sentence may include one or more words.

The first calculation unit 102 may be configured to, according to the total number of the training sentences included in each interpretive category, calculate the first probability corresponding to each interpretive category. The second calculation unit 103 may be configured to, according to the correspondence relationships between the training sentences and emojis, determine the emojis included in each interpretive category and calculate the second probability corresponding to each emoji in each interpretive category. The third calculation unit 104 may be configured to, according to the number of occurrence of each word in each interpretive category, calculate the third probability corresponding to each word in each interpretive category.

Farther, the real-time recommendation unit 200 may include a fourth calculation unit 201, a target category determination unit 202, and a real-time recommendation executing unit 203. The fourth calculation unit 201 may be configured to, according to the first probability and the third probability, utilize the Bayes formula to calculate the fourth probability of the target in sentence inputted by the user belonging to each of the interpretive categories. In particular, the target sentence may include one or more target words.

The target category determination unit 202 may be configured to, according to the fourth probability, determine the target interpretive category corresponding to the target sentence. The real-time recommendation executing unit 203 may be configured to, according to the second probability corresponding to each emoji included in the target interpretive category, carry out the emoji recommendation.

From technical solutions above, the present disclosure may first carry out clustering of the training sentences corresponding to each emoji, and carry out corpus training based on the interpretive category after clustering, thus avoiding the disorder caused by one emoji corresponding to a plurality of training sentences with unrelated meanings and improving the accuracy of the corpus training. Further, during the process of corpus training, the first probability corresponding to each interpretive category may be calculated, and the third probability corresponding to each word in each interpretive category may be calculated.

Further, according to the first probability and the third probability and combing the Bayes formula, probability analysis concerning the match of the meaning for the target sentence inputted by the user in real-time that is as accurate as each word may be performed. Accordingly, the issue that the recommendation triggering probability being extremely low in existing recommendation methods based on absolute matching of the emojis may be avoided. The target interpretive category determined by the final analysis may also be ensured to be the interpretive category having the closest real meaning to the target sentence, thus ensuring that the recommended emoji may better satisfy the current needs of the user. Thus, the recommendation accuracy may be improved, and the input efficiency of the emojis by the user may be improved, thus improving the user experience.

Optionally, the specific calculation principles and calculation equations adopted by the first calculation equation, the second calculation equation, the third calculation equation, and the fourth calculation equation may refer to steps S12~S15 described above, and are not repeated here.

Optionally, the target category determination unit 202 may specifically include at least one of the first determination unit and the second determination unit. The first determination unit may be configured to determine whether the maximum value of the fourth probability is greater than the first threshold or not. When the maximum value of the fourth probability is greater than the first threshold, the first determination unit may use the interpretive category corresponding to the maximum value of the fourth probability as the target interpretive category.

Further, the second determination unit may be configured to, according to the descending order of the fourth probability, sort each interpretive category, and according to the sorting result, calculate the scam of the fourth probabilities of the first S interpretive categories. The second determination unit may further determine whether the ratio of the maximum value of the fourth probability to the sum of the fourth probabilities is greater than a second threshold or not. When the ratio is greater than the second threshold, the second determination unit may use the interpretive category corresponding to the maximum value of the fourth probability as the target interpretive category.

The specific calculation principles and calculation equations adopted by the first, determination unit and the second determination unit may refer to steps S1611, S1612, S1621, and S1624 described above, and are not repeated here.

In one embodiment, the real-time recommendation unit 200 may also include a scenario determination unit. The scenario determination unit may be configured to determine whether the current input scenario is a preset scenario or not, and when the current input scenario is not a preset scenario, trigger the fourth calculation unit.

The present disclosure may define the triggering timing of the emoji recommendation via the scenario determination unit, and steps S26~S28 may only be executed in informal situations where the occurrence of emojis is appropriate, thus assisting the users to rapidly input emojis. Simultaneously, the frequent emoji recommendation in situations where the occurrence of emojis is inappropriate may be avoided, and the normal word input efficiency may not be affected.

In one embodiment, the corpus training unit may also include a segmentation unit and/or stopword filtering unit. The segmentation unit may be configured to, before calculating the third probability corresponding to each word in the corresponding interpretive category, when the training sentence is in the first language style, segmenting the training sentence. The stopword filtering unit may be configured to, before calculating the third probability corresponding to each word in the corresponding interpretive category, carry out stopword filtering for the words included in the training sentence.

In the present disclosure, for the first language such as Chinese and Japanese that cannot distinguish each word included in one sentence, the segmentation unit may accurately distinguish each word included in the training sentence to improve the calculational accuracy of the third calculation unit. Thus, the accuracy of the emoji recommendation may be further improved. For English or French, etc., different words may be easily distinguished via space characters.

In the present disclosure, by removing stopwords that have no actual meaning in the training sentences via the stopword filtering unit, the third calculation unit may calculate the third probability merely based on words having actual meanings. Thus, the calculational accuracy may be improved, and the emoji recommendation accuracy may be improved.

In other embodiments of the present disclosure, an additional segmentation unit may be configured in the real-time recommendation unit to further improve the recommendation accuracy of the emojis. Before calculating the fourth probability, the additional segmentation unit may carry out segmentation processing of the target sentence when the target sentence is in the first language style. Simultaneously, an additional stopword filtering unit may also be configured in the real-time recommendation unit. Before calculating the fourth probability, the additional stopword filtering unit may be configured to carry out stopword filtering for the words included in the target sentence.

Figure 4:
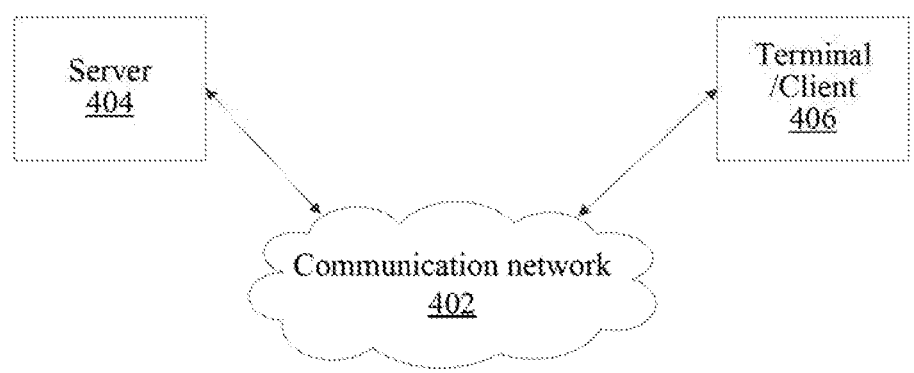
FIG. 4 illustrates an exemplary operating environment incorporating certain disclosed embodiments.

FIG. 4 depicts an exemplary environment 400 incorporating the exemplary methods and mobile terminals in accordance with various disclosed embodiments. As shown in FIG. 4, the environment 400 can include a server 404, a terminal 406, and a communication network 402. The server 404 and the terminal 406 may be coupled through the communication network 402 for information exchange, e.g., input method corpus updating, emoji recommendation model updating, etc. Although only one terminal 406 and one server 404 are shown in the environment 400, any number of terminals 406 or servers 404 may be included, and other devices may also be included.

The communication network 402 may include any appropriate type of communication network for providing network connections to the server 404 and terminal 406 or among multiple servers 404 or terminals 406. For example, the communication network 402 may include the Internet or other types of computer networks or telecommunication networks, either wired or wireless.

A terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing device.

A server, as used herein, may refer to one or more server computers configured to provide certain server functionalities, e.g., network data storage and database management. A server may also include one or n ore processors to execute computer programs in parallel.

Figure 5:
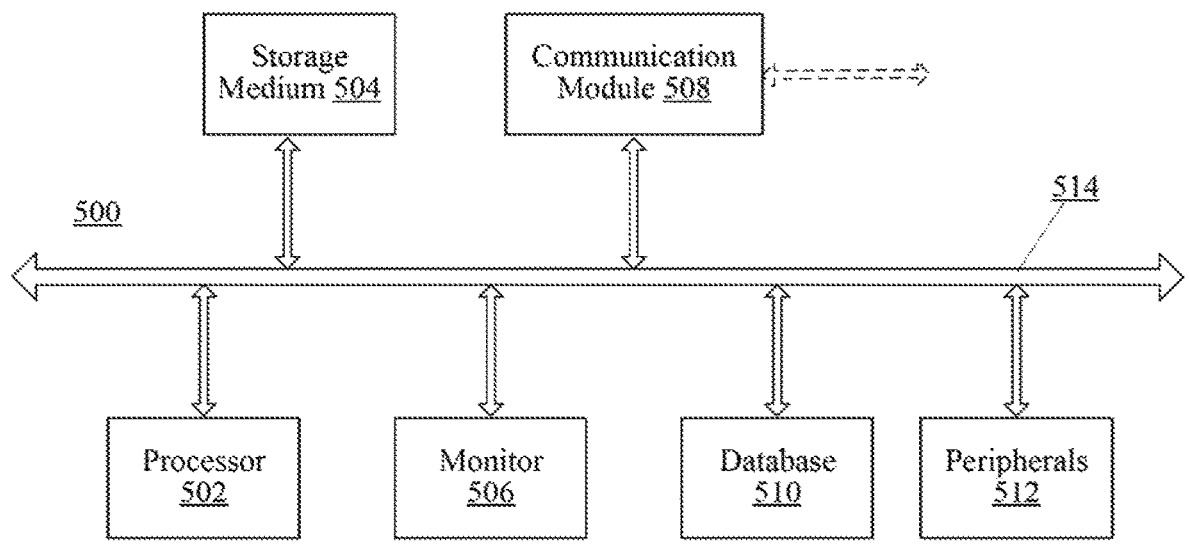
FIG. 5 illustrates a block diagram of an exemplary computer system consistent with the disclosed embodiments.

The server 404 and the terminal 406 may be implemented on any appropriate computing platform. FIG. 5 shows a block diagram of an exemplary computing system 500 capable of implementing the server 404 and/or the terminal 406. As shown in FIG. 5, the exemplary computer system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, e.g., Read-Only Memory (ROM), Random Access Memory (RAM), and flash memory modules, and mass storages, e.g., CD-ROM, U-disk, removable hard disk, etc. The storage medium 504 may store computer programs for implementing various processes (e.g., running an input method application, recommending an emoji in the input method application, etc.), when executed by the processor 502.

The monitor 506 may include display devices for displaying contents in the computing system 500, e.g., displaying an input method user interface, displaying a recommended emoji. The peripherals 512 may include I/O devices, e.g., keyboard and mouse for inputting information by a user. The peripherals may also include certain sensors, such as gravity sensors, acceleration sensors, and other types of sensors.

Further, the communication module 508 may include network devices for establishing connections through the communication network 402. The database 510 may include one or more databases for storing certain data and for performing certain operations on the stored data, e.g., emoji database, corpus for the input method, emoji recommendation model, etc.

In operation, the terminal 406 or the server 404 (e.g., processor 502) may implement the corpus training unit 100 of the disclosed emoji, recommendation device, and steps S11~S15 or steps S21~S24 of the disclosed emoji recommendation method, for obtaining the emoji recommendation model. Further, the terminal 406 (e.g., processor 502) may be configured to implement the real-time recommendation unit 200 of the disclosed emoji recommendation device, steps S15~S17 or steps S25~S28 of the disclosed emoji recommendation method. For example, the input method application installed on the terminal 406 may receive an updated emoji recommendation model trained by the server 404 through the communication network 402. When a user using the input method to input sentences on the terminal 406, the terminal 406 may recommend at, least one emoji on a user interface of the input method in real time according to an inputted sentence.

In addition, each functional module/unit in various disclosed embodiments can be integrated in a processing unit, or each module/unit can exist separately and physically, or two or more modules/units can be integrated in one unit. The integrated units as disclosed above can be implemented in the form of hardware and/or in the form of software functional unit(s).

Various embodiments of the specification are described in a narrative way, each embodiment highlights its difference from other embodiments, and the same or similar parts between various embodiments may refer to each other. For the disclosed device, because it corresponds to the disclosed method in the embodiments, the descriptions are thus relatively simple, and the related parts may be referred to the descriptions of the method.

It should be understood that, the present disclosure is not limited to the precise structure described above as well as illustrated in the accompanying drawings. Any equivalent or modification thereof, without departing from the spirit and principle of the present invention, falls within the scope of the present disclosure, and the scope of the present disclosure is defined by the appended claims.

What is claimed is:

1. An emoji recommendation method, comprising:
obtaining a plurality of meanings corresponding to each of a plurality of emojis, each of the plurality of meanings being a word or phrase representing a corresponding emoji;
expanding each of the plurality of meanings in each of the plurality of emojis by a plurality of training sentences, each of the plurality of training sentences describing the word or phrase of a corresponding meaning by description words;
combining the plurality of training sentences corresponding to each of the plurality of meanings in each of the plurality of emojis to obtain an entire set of training sentences corresponding to the plurality of emojis;
for the plurality of emojis corresponding to the entire set of training sentences, segmenting the description words of each training sentence into one or more words and filtering out a stopword and a punctuation from the one or more words;
clustering, based on the segmented one or more words, the entire set of training sentences to obtain a plurality of interpretive categories, including:

calculating similarity of meanings, based on the segmented one or more words, between two of the training sentences by a cosine distance between the two training sentences $$d_{ij} = \frac{s_{ij}}{\sqrt{n_i n_j}},$$

where $n_i$ and $n_j$ each represent a total number of words in a corresponding training sentence, and $s_{ij}$ represents a number of identical words from the segmented one or more words in the two training sentences; and
grouping the entire set of training sentences based on the similarity of meanings into the plurality of interpretive categories, one of the plurality of interpretive categories including one or more of the plurality of emojis;
according to a total number of one or more training sentences included in each interpretive category, calculating a first probability corresponding to each interpretive category;
according to correspondence relationships between the training sentences and the emojis, determining one or more emojis included in each interpretive category, and calculating a second probability corresponding to each emoji in each interpretive category;
according to a number of occurrences of each word in each interpretive category, calculating a third probability corresponding to each word in each interpretive category;
determining whether a current input scenario is a preset scenario;
when the current input scenario is not the preset scenario, according to the first probability and the third probability, utilizing the Bayes formula to calculate a fourth probability $P(C_i|w_i)$ of a target sentence inputted by a user belonging to each of the interpretive categories $C_i$, wherein the target sentence includes one or more target words $w_i$, and the fourth probability is calculated by:

$$P(C_i \mid w_1, w_2, w_3, \ldots, w_n) = \frac{P(w_1, w_2, w_3, \ldots, w_n \mid C_i)P(C_i)}{P(w_1, w_2, w_3, \ldots, w_n)} = \frac{\prod_{j=1}^{n} P(w_j \mid C_i)P(C_i)}{P(w_1, w_2, w_3, \ldots, w_n)}, i = 1,$$

2, . . . , m, m being a total number of the interpretative categories, and j=1,2, . . . , n, n being a total number of the one or more target words;
according to the fourth probabilities corresponding to the interpretive categories, determining a target interpretive category corresponding to the target sentence; and
according to the second probability corresponding to each emoji included in the target interpretive category, displaying at least one emoji.

2. The method according to claim 1, wherein, according to the total number of the one or more training sentences included in each interpretive category, calculating the first probability corresponding to each interpretive category comprises:
provided that i=1, 2, . . . , m, and m is the total number of the interpretive categories:

counting the total number $N_{C_i}$ of the training sentences included in each interpretive category $C_i$, respectively; and calculating the first probability $P(C_i)$ corresponding to each interpretive category $C_i$ by:

$$P(C_i) = \frac{N_{C_i}}{\sum_{l=1}^{m} N_{C_l}}.$$

3. The method according to claim 1, wherein calculating the second probability corresponding to each emoji in each interpretive category comprises:

provided that i=1, 2, ..., m, m is the total number of the interpretive categories; and k=1, 2, ..., p, and p is a total number of the emojis:

counting a number of occurrences $N_{ie_k}$ of each emoji $e_k$ in each interpretive category $C_i$; and calculating the second probability $P(e_k|C_i)$ corresponding to each emoji $e_k$ in each interpretive category $C_i$ by:

$$P(e_k \mid C_i) = \frac{N_{ie_k}}{\sum_{l=1}^{p} N_{ie_l}}.$$

4. The method according to claim 1, wherein, according to the number of occurrences of each word in each interpretive category, calculating the third probability corresponding to each word in each interpretive category comprises:

provided that i=1, 2, ..., m, m is the total number of the interpretive categories; and j=1, 2, ..., q, and q is the total number of the words:

counting the number of occurrences $N_{iw_j}$ of each word $w_j$ in each interpretive category $C_i$; and calculating the third probability $P(w_j|C_i)$ corresponding to each word $w_j$ in each interpretive category $C_i$ by:

$$P(w_j \mid C_i) = \frac{N_{iw_j}}{\sum_{l=1}^{q} N_{iw_l}}.$$

5. The method according to claim 1, wherein, according to the fourth probabilities corresponding to the interpretive categories, determining the target interpretive category corresponding to the target sentence comprises:

determining whether a maximum value of the fourth probabilities is greater than a first threshold; and when the maximum value of the fourth probabilities is greater than the first threshold, using the interpretive category corresponding to the maximum value of the fourth probabilities as the target interpretive category.

6. The method according to claim 1, wherein, according to the fourth probabilities corresponding to the interpretive categories, determining the target interpretive category corresponding to the target sentence comprises:

according to a descending order of the fourth probabilities, sorting the corresponding interpretive categories;

according to the sorting result, calculating a sum of the fourth probabilities of first S interpretive categories, S being an integer greater than 1;

determining whether a ratio of a maximum value of the fourth probabilities to the sum of the fourth probabilities of the first S interpretive categories is greater than a second threshold; and when the ratio is greater than the second threshold, using the interpretive category corresponding to the maximum value of the fourth probabilities as the target interpretive category.

7. The method according to claim 1, wherein, before clustering the entire set of training sentences, the method executes:

segmenting the entire set of training sentences; and filtering out the stopword and the punctuation included in each training sentence.

8. An emoji recommendation device, comprising a monitor and one or more processors that are coupled to the monitor and configured to:

acquire a plurality of meanings corresponding to each of a plurality of emojis, each of the plurality of meanings being a word or phrase representing a corresponding emoji;

expand each of the plurality of meanings in each of the plurality of emojis by a plurality of training sentences, each of the plurality of training sentences describing the word or phrase of a corresponding meaning by description words;

combining the plurality of training sentences corresponding to each of the plurality of meanings in each of the plurality of emojis to obtain an entire set of training sentences corresponding to the plurality of emojis;

for the plurality of emojis corresponding to the entire set of training sentences, segment the description words of each training sentence into one or more words and filter out a stopword and a punctuation from the one or more words;

cluster, based on the segmented one or more words, the entire set of training sentences to obtain a plurality of interpretive categories, including:

calculating similarity of meanings, based on the segmented one or more words, between two of the training sentences by a cosine distance between the two training sentences $$d_{ij} = \frac{s_{ij}}{\sqrt{n_i n_j}},$$

where $n_i$ and $n_j$ each represent a total number of words in a corresponding training sentence, and $s_{ij}$ represents a number of identical words from the segmented one or more words in the two training sentences; and grouping the entire set of training sentences based on the similarity of meanings into the plurality of interpretive categories, one of the plurality of interpretive categories including one or more of the plurality of emojis;

according to a total number of one or more training sentences included in each interpretive category, calculate a first probability corresponding to each interpretive category;

according to correspondence relationships between the training sentences and the emojis, determine one or more emojis included in each interpretive category and calculate a second probability corresponding to each emoji in each interpretive category;

according to a number of occurrences of each word in each interpretive category, calculate a third probability corresponding to each word in each interpretive category;

determining whether a current input scenario is a preset scenario;

when the current input scenario is not the preset scenario, according to the first probability and the third probability, utilize the Bayes formula to calculate a fourth probability $P(C_i|w_j)$ of a target sentence inputted by a user belonging to each of the interpretive categories $C_i$, wherein the target sentence comprises one or more target words $w_j$, and the fourth probability is calculated by:

$$P(C_i \mid w_1, w_2, w_3, \ldots, w_n) = \frac{P(w_1, w_2, w_3, \ldots, w_n \mid C_i)P(C_i)}{P(w_1, w_2, w_3, \ldots, w_n)} = \frac{\prod_{j=1}^{n} P(w_j \mid C_i)P(C_i)}{P(w_1, w_2, w_3, \ldots, w_n)}, i = 1, 2, \ldots, m,$$

m being a total number of the interpretative categories, and j=1,2, . . . , n, n being a total number of the one or more target words;

according to the fourth probabilities corresponding to the interpretive categories, determine a target interpretive category corresponding to the target sentence; and according to the second probability corresponding to each emoji included in the target interpretive category, display, on the monitor, at least one emoji.

9. The device according to claim 8, wherein the one or more processors are further configured to:

determine whether a maximum value of the fourth probabilities is greater than a first threshold, and when the maximum value of the fourth probabilities is greater than the first threshold, use the interpretive category corresponding to the maximum value of the fourth probabilities as the target interpretive category;

according to a descending order of the fourth probabilities, sort the corresponding interpretive categories, and according to a sorting result, calculate a sum of fourth probabilities of first S interpretive categories, S being an integer greater than 1; and determine whether a ratio of the maximum value of the fourth probabilities to the sum of the fourth probabilities of first S interpretive categories is greater than a second threshold, and when the ratio is greater than the second threshold, use the interpretive category corresponding to the maximum value of the fourth probability as the target interpretive category.

10. The device according to claim 8, wherein the one or more processors are further configured to, before clustering the entire set of training sentences:

segment the entire set of training sentences; and filter out the stopword and the punctuation included in each training sentence.

\* \* \* \* \*